United States Patent [19]
Holbrook et al.

[11] Patent Number: 6,132,795
[45] Date of Patent: Oct. 17, 2000

[54] VEGETABLE PROTEIN COMPOSITION CONTAINING AN ISOFLAVONE DEPLETED VEGETABLE PROTEIN MATERIAL WITH AN ISOFLAVONE CONTAINING MATERIAL

[75] Inventors: James L. Holbrook, Troy, Ill.; Doyle H. Waggle, St. Louis, Mo.

[73] Assignee: Protein Technologies International, Inc., St. Louis, Mo.

[21] Appl. No.: 09/044,961

[22] Filed: Mar. 15, 1998

[51] Int. Cl.[7] .................. A23L 1/20; A23J 1/00; A23J 1/14
[52] U.S. Cl. .................. 426/634; 426/656; 530/378
[58] Field of Search .................. 426/656, 634; 435/68.1, 76, 125, 200, 272; 424/195.1; 252/398, 404, 407; 530/370, 378, 412, 414; 549/402, 403; 514/2, 456

[56] References Cited

U.S. PATENT DOCUMENTS

| | | | |
|---|---|---|---|
| 3,870,805 | 3/1975 | Hayes et al. | 426/148 |
| 4,157,984 | 6/1979 | Zilliken | 252/407 |
| 4,218,489 | 8/1980 | Zilliken | 426/545 |
| 4,232,122 | 11/1980 | Zilliken | 435/52 |
| 4,264,509 | 4/1981 | Zilliken | 260/345 |
| 4,366,082 | 12/1982 | Zilliken | 252/404 |
| 4,366,248 | 12/1982 | Zilliken | 435/125 |
| 4,390,559 | 6/1983 | Zilliken | 426/545 |
| 4,428,876 | 1/1984 | Iwamura | 260/123.5 |
| 4,889,921 | 12/1989 | Diosady et al. | 530/377 |
| 5,141,746 | 8/1992 | Fleury et al. | 424/195.1 |
| 5,320,949 | 6/1994 | Shen | 435/68.1 |
| 5,352,384 | 10/1994 | Shen | 252/398 |
| 5,506,211 | 4/1996 | Barnes et al. | 514/27 |
| 5,516,528 | 5/1996 | Hughes et al. | 424/464 |
| 5,569,459 | 10/1996 | Shlyankevich | 424/195.1 |
| 5,637,561 | 6/1997 | Shen et al. | 514/2 |
| 5,637,562 | 6/1997 | Shen et al. | 514/2 |
| 5,654,011 | 8/1997 | Jackson et al. | 424/514 |
| 5,670,632 | 9/1997 | Chaihorsky | 536/8 |
| 5,679,806 | 10/1997 | Zheng et al. | 549/403 |
| 5,702,752 | 12/1997 | Gugger et al. | 426/634 |
| 5,726,034 | 3/1998 | Bryan et al. | 435/68.1 |
| 5,821,361 | 11/1998 | Waggle et al. | 514/182 |
| 5,830,887 | 11/1998 | Kelly | 514/182 |
| 5,858,449 | 1/1999 | Crank et al. | 426/656 |

FOREIGN PATENT DOCUMENTS

| | | |
|---|---|---|
| 647408A1 | 4/1995 | European Pat. Off. . |
| 59-085265A | 5/1984 | Japan . |
| 59-232052A | 12/1984 | Japan . |
| 62-036163A | 2/1987 | Japan . |
| 62-126186A | 6/1987 | Japan . |
| 63-245648A | 10/1988 | Japan . |
| 1-258669 | 10/1989 | Japan . |
| 30-47049 | 2/1991 | Japan . |
| 4-266898A | 2/1991 | Japan . |
| 40-36242 | 2/1992 | Japan . |
| 4-283518 A1 | 10/1992 | Japan . |
| 5170756A | 7/1993 | Japan . |
| 53-28929 | 12/1993 | Japan . |
| 40-34526B | 8/1994 | Japan . |
| 59-137421A | 8/1994 | Japan . |
| 6287554A | 10/1994 | Japan . |
| 8-214787A | 8/1996 | Japan . |
| 82-83283A | 10/1996 | Japan . |
| 90-23822A | 1/1997 | Japan . |
| WO 93/23069 | 11/1993 | WIPO . |
| WO 95/10530 | 4/1995 | WIPO . |
| WO 96/10341 A1 | 4/1996 | WIPO . |
| WO 97/07811 | 3/1997 | WIPO . |

OTHER PUBLICATIONS

*Determination of isoflavones in soybean flours, protein concentrates, and isolates*, Eldridge, *J. Agric. Food Chem.*, vol. 30, pp. 353–55 (1982).

*Objectionable Flavor of Soy Milk Developed during the Soaking of Soybeans and its Control*, Matsurra, Obata, Fukushima, *J. Food Science*, vol. 54, No. 3, pp. 602–05 (1989).

*Isoflavone Content in Commercial Soybean Foods*, Wang and Murphy, *J. Agric. Food Chem.*, vol. 42, No. 8, pp. 1666–73 (1994).

*Control of Serum Lipids with Soy Protein*, Erdman, *New England J. of Med.*, vol. 333, No. 5, pp. 313–15 (Aug. 3, 1995).

*Soy in the Spotlight*, Kuhn, *Food Process.*, vol. 57, No. 5, pp. 52–58 (1996).

*Studies on the Mechanism of the Cholesterol Lowering Activity of Soy Proteins*, Lovati et al., *Nutr. Metab. Cardiovasc. Dis.*, vol. 1, pp. 18–24 (1991).

*Quantitation of Phytoestrogens in Legumes by HPLC*, Franke et al., *J. Agric. Food Chem.*, vol. 42, pp. 1905–13 (1994).

*Phytoestrogen Content of Processed Soybean Products*, Murphy, *Food Technology*, pp. 60, 62–64 (Jan. 1982).

*Total Genistein and Daidzein Content of Soyfoods*, Murphy and Wang, *Food Composition*, Abstract 4283.

*Genistein, Daidzein, and Their β–Glycoside Conjugates: Antitumor Isoflavones in Soybean Foods from American and Asian Diets*, Coward et al., *J. Agric. Food Chem.*, 41:1961–67; (1993).

*Mass Balance Study of Isoflavones during Soybean Processing*, Wang & Murphy, *J. Agric. Food Chem.*, 44:2377–83; (1996).

*Separation and Determination of Isoflavones in the Protein Concentrate from Red Clover Leaves*, Glacross et al., *J. Sci. Fd. Agric.*, 23:371–76; (1972).

Primary Examiner—Anthony J. Weier
Attorney, Agent, or Firm—Richard B. Taylor

[57] ABSTRACT

The present invention is a vegetable protein composition. The vegetable protein composition contains an isoflavone depleted vegetable protein material and an isoflavone containing material which is dispersed in the isoflavone depleted vegetable protein material. The composition may be used in foods to provide the nutritional benefits of the isoflavone depleted vegetable protein material while providing the health benefits of the isoflavone containing material. The invention also includes processes for forming such vegetable protein compositions.

57 Claims, No Drawings

VEGETABLE PROTEIN COMPOSITION CONTAINING AN ISOFLAVONE DEPLETED VEGETABLE PROTEIN MATERIAL WITH AN ISOFLAVONE CONTAINING MATERIAL

FIELD OF THE INVENTION

The present invention relates to vegetable protein compositions containing isoflavones, and particularly to vegetable protein compositions containing an isoflavone depleted vegetable protein material with an isoflavone containing material dispersed therein, and processes for producing the same.

BACKGROUND OF THE INVENTION

Vegetable materials which contain protein are commercially processed to produce vegetable protein materials such as vegetable protein concentrates and vegetable protein isolates. Commonly produced vegetable protein materials include soy protein concentrates, soy protein isolates, pea protein materials, and protein materials derived from legumes. Vegetable protein materials are widely used in the food industry as protein enrichment ingredients or as functional ingredients in a wide variety of foods. For example, vegetable protein materials are used in such food products as meats, nutritional beverages, soups, cheeses, bakery products, and yogurts.

Several varieties of vegetable materials containing protein also contain phytoestrogenic isoflavones in their native, unprocessed state. Isoflavones are phenolic compounds occurring naturally in numerous types of plants which serve to aid in the fixation of nitrogen in the root systems of certain plants, and to act as a natural protectant against parasites.

In the production of vegetable protein materials such as vegetable protein concentrates and vegetable protein isolates for use in foods, the focus has been to obtain a material which is comprised primarily of protein. In the production of vegetable protein materials from vegetable materials containing protein and isoflavones, a substantial portion of the isoflavones are separated from the vegetable protein, resulting in a protein rich material which has been depleted in isoflavone content. For example, vegetable protein concentrates are formed by washing a vegetable material with an aqueous alcohol or an aqueous acidic solution having a pH at about the isoelectric point of the protein. See, e.g., Soy Protein Products, Characteristics, Nutritional Aspects, and Utilization, pp. 3–6 (Pub. Soy Protein Council, 1987). The aqueous acid or alcohol wash removes materials soluble in the wash, including a substantial portion of the isoflavones and carbohydrates in the vegetable material, from protein and other insoluble materials such as vegetable fiber materials, leaving a protein concentrate material which contains from 65% to 90% protein by weight, but which is significantly reduced in isoflavone concentration.

Protein isolates are formed by extracting a vegetable material containing protein with water or an aqueous alkaline solution to solubilize protein and other materials soluble in the aqueous solution such as carbohydrates and isoflavones. The extract containing solubilized protein is separated from insoluble vegetable fiber material, and then the pH of the extract is adjusted to about the isoelectric point of the protein to precipitate the protein. The protein is then separated from the extract and the materials still soluble in the extract, including a substantial portion of the isoflavones, to form a protein isolate material containing 90% or more protein by weight. The protein isolate is washed with water to further remove water soluble materials from the protein. See, e.g., Soy Protein Products, Characteristics, Nutritional Aspects, and Utilization pp. 3–6 (Pub. Soy Protein Council, 1987). The resulting protein isolate is significantly reduced in isoflavone concentration relative to the vegetable material from which the protein isolate is derived.

Removal of isoflavones from vegetable protein materials in the production of protein concentrates and vegetable protein isolates has been an objective in processing of such materials, since isoflavones have been associated with the bitter taste of vegetable protein materials such as soy. For example, Japanese Patent No. 59-232052A teaches a process for removing isoflavones from a soybean protein material by contacting the protein material with an adsorbent resin to produce a better tasting soybean protein. Alcohol extraction of vegetable protein materials to remove alcohol soluble components from the protein is particularly preferred since alcohol extraction produces a better tasting vegetable protein material than aqueous extraction, in part because alcohol is quite effective in removing isoflavone compounds from the vegetable protein material. See, e.g., Japanese Patent No. 63-245,648A.

Isoflavones, however, have recently been implicated as compounds which are responsible for several health benefits in humans. It has been suggested that isoflavones may be effective to prevent or retard certain cancers such as prostate cancer and breast cancer, as described in the following articles: *Genistein Inhibition of the Growth of Human Breast Cancer Cells, Independence from Estrogen Receptors and the Multi-Drug Resistance Gene.* Peterson and Barnes, *Biochemical and Biophysical Research, Communications,* Vol. 179, No. 1, pp. 661–67 (Aug. 30, 1991); *Genistein and Biochanin A Inhibit the Growth of Human Prostate Cancer Cells but not Epidermal Growth Factor Tyrosine Autophosphorylation,* Peterson and Barnes, *The Prostate,* Vol. 22, pp. 335–45, (1993), and *Soybeans Inhibit Mammarm Tumors in Models of Breast Cancer,* Barnes et al., *Mutagens and Carcinogens in the Diet,* pp. 239–53 (1990). It has been postulated that the low incidence of breast cancer in Japanese women is due to a diet which contains large amounts of isoflavones. *Soybean Phytoestrogen Intake and Cancer Risk,* Herman et al., *First International Symposium on the Role of Soy in Preventing and Treating Chronic Disease,* pp. 757S–770S (Feb. 20–23, 1994). Isoflavones are also believed to reduce or prevent menopausal symptoms. *Dietary Phyto-oestrogens and the Menopause in Japan,* Adlercreutz et al., *The Lancet,* Vol. 339, p. 1233 May 16, 1992). Furthermore, isoflavones have been identified as vasodilating agents in humans and in non-human primates, with corresponding cardioprotective effects. *Enhancement of Coronary Vasodilation by Soy Phytoestrolens and Genistein,* Honore et al., *Circulation,* 92:1:349 (1995).

Recent efforts to obtain the medical benefits of isoflavones have focused on separating and recovering the isoflavones from plant materials. The following patents describe various methods of separating isoflavones from plant materials such as pueraria lobata, legumes, and soy: U.S. Pat. Nos. 4,428,876; 5,702,752; 5,679,806; 4,390,559; 4,366,248; 4,366,082; 4,264,509; 4,232,122; 4,157,984; Japanese Patent Nos. 1-258669A; 5-170756A; 41-90720A; 62-126186A; 62-126185A; and PCT patent application No. WO 93/23069. The separated isoflavone materials may be utilized in pharmaceutical or dietary supplement compositions as described in U.S. Pat. Nos. 5,516,528; 5,424,331; 5,569,459; 5,654,011 and PCT patent application No. WO 93/23069.

While purified isoflavone compositions may be useful in pharmaceutical compositions and dietary supplements to treat and prevent a variety of conditions, recent studies indicate that some health benefits available from vegetable protein materials containing substantial amounts of isoflavones cannot be provided by the isoflavones alone or the vegetable protein material when the vegetable protein material is substantially depleted of isoflavones. Ingestion of soy protein materials containing substantial amounts of isoflavones has been shown to reduce the significant coronary heart disease factors total cholesterol and low density lipoprotein cholesterol (LDL-cholesterol) in non-human primates, where it is postulated that the soy isoflavones are responsible for up to 70% of the hypocholesterolemic effect, and appears to have the same effect in humans having elevated levels of cholesterol. See, e.g., s; *Meta-Analysis of the Effects of Soy Protein Intake on Serum Lipids,* Anderson et al., *N. Engl. J Med.,* Vol.333, No.5, pp. 276–82 (1995). Ingestion of tablets containing isoflavones purified from soy, however, has been shown to have no effect on total cholesterol and LDL-cholesterol in menopausal and perimenopausal women. *Soy Isoflavones Improve Systemic Arterial Compliance but Not Plasma Lipids in Menopausal and Perimenopausal Women,* Nestel et al., *Arteriosclerosis, Thrombosis, and Vascular Biology,* Vol. 17, No. 12 (Dec. 1997). Likewise, alcohol extracted soy protein, which contains minimal amounts of isoflavones, has been shown to have little or no effect on total cholesterol and LDL cholesterol. Anthony.

Efforts have also been made to maximize the health benefits from isoflavones remaining in processed vegetable protein materials such as a vegetable protein concentrates or a vegetable protein isolates by converting the isoflavones remaining therein to their most biologically active form. For example, U.S. Pat. No. 5,637,562 provides a process for producing an aglucone isoflavone enriched vegetable protein concentrate in which isoflavone glucosides are converted to the more biologically active aglucone isoflavone by enzymatic cleavage of a glucoside moiety from the isoflavone glucosides. PCT Patent Application No. PCT/US94/10697 discloses a process for producing an aglucone isoflavone enriched vegetable protein isolate by converting isoflavone glucosides to aglucone isoflavones prior to precipitating a protein material from an extract containing soluble protein and isoflavones.

SUMMARY OF THE INVENTION

The present invention provides a vegetable protein composition containing an isoflavone depleted vegetable protein material and an isoflavone containing material dispersed in the vegetable protein material. The vegetable protein composition of the present invention may have any selected amount of isoflavones dispersed therein, and preferably has an amount of isoflavones dispersed therein to render the vegetable protein composition effective to treat or prevent targeted adverse health conditions.

In another aspect, the present invention is a process for forming a vegetable protein composition in which an isoflavone depleted vegetable protein material and an isoflavone containing material are provided, and the isoflavone containing material is dispersed in the isoflavone depleted vegetable protein material.

In yet another aspect, the present invention is a process for forming a vegetable protein composition in which a vegetable material containing protein and isoflavones is provided, and is extracted with an extractant effective to solubilize isoflavones to form an extract containing isoflavones. An isoflavone depleted vegetable protein material is then separated from the extract containing isoflavones, and an isoflavone containing material is formed from the extract. The isoflavone containing material is then dispersed in the isoflavone depleted vegetable protein material.

In a most preferred embodiment, the isoflavone depleted vegetable protein material is an alcohol extracted vegetable protein material to provide a good tasting vegetable protein material.

DESCRIPTION OF THE PREFERRED EMBODIMENTS

The vegetable protein composition of the present invention includes an isoflavone depleted vegetable protein material and an isoflavone containing material which is dispersed in the isoflavone depleted vegetable protein material.

ISOFLAVONE DEPLETED VEGETABLE PROTEIN MATERIALS

Isoflavone depleted vegetable protein materials used in the composition are vegetable protein materials which may be used as a protein enrichment ingredient in a food material or as a functional ingredient in a food material. Vegetable protein materials which are used as a protein enrichment ingredient in a food material include vegetable protein materials which are used to provide supplemental protein in a food material as well as vegetable protein materials which are used to provide the total protein content in a food material. Vegetable protein materials which are used as functional ingredients in a food material include vegetable protein materials which are used to provide emulsive properties to a food material, vegetable protein materials which are used to bind fat, oils or water in a food material, and vegetable protein materials which are used to provide gelling properties to a food material.

The isoflavone depleted vegetable protein materials used in the composition of the invention are derived from vegetable materials which contain protein and isoflavones. As used herein, the term "isoflavone depleted" refers to the concentration of isoflavones in a vegetable protein material relative to the concentration of isoflavones in a vegetable material from which the vegetable protein material is derived. Preferably the isoflavone depleted vegetable protein material is a soy protein material, a lupin protein material, a legume protein material, or a pea protein material. Most preferably the isoflavone depleted vegetable protein material is a soy protein material.

Preferably the isoflavone depleted vegetable protein material is a vegetable protein concentrate or a vegetable protein isolate. As used herein the term "vegetable protein concentrate" has the same meaning as is conventionally associated with the term vegetable protein concentrate except that the vegetable protein concentrate is derived from a vegetable material containing both isoflavones and protein. Specifically, the term vegetable protein concentrate, as used herein, is a material derived from a vegetable material containing isoflavones and protein by washing or extracting the vegetable material with an aqueous solution having a pH at about the isoelectric point of the protein in the vegetable material or with an alcohol solution, and separating the wash or extract solution from the vegetable material to provide the vegetable protein concentrate. A vegetable protein concentrate, as utilized in the invention, has a dry weight protein content of from about 65% to about 90% by weight.

As used herein the term "vegetable protein isolate" has the same meaning conventionally associated with the term vegetable protein isolate except that the vegetable protein isolate is derived from a vegetable material containing both isoflavones and protein. Specifically, the term vegetable protein isolate, as used herein, is a material derived from a vegetable material containing isoflavones and protein by 1) extracting the vegetable material with water or an aqueous alkaline solution having a pH from about 7 to about 11 to solubilize the protein and isoflavones in the extractant; 2) separating the extractant from insoluble vegetable materials; 3) precipitating the protein from the separated extract by adjusting the pH of the extract to about the isoelectric point of the protein; 4) separating the precipitated protein from the extract; and 5) optionally, but preferably, washing the separated protein with water and/or alcohol. A vegetable protein isolate, as utilized in the invention, has a dry weight protein content of at least 90% by weight.

In a particularly preferred embodiment, the vegetable protein concentrate or vegetable protein isolate is an alcohol extracted or washed material since alcohol extraction provides a protein material especially suitable for use in a food material. A vegetable protein concentrate may be extracted with an alcohol solution in the formation of the vegetable protein concentrate, or may be extracted with an alcohol after the vegetable protein concentrate is formed by an isoelectric aqueous wash. A vegetable protein isolate is extracted or washed with an alcohol after being precipitated and separated from the aqueous alkaline extract. The vegetable protein concentrate or isolate is preferably extracted or washed with a food grade alcohol, most preferably with an aqueous ethanol solution containing from about 55% to about 90% ethanol.

Isoflavone Containing Materials

Isoflavone containing materials used in the composition may be materials separated from a plant material containing isoflavones. Plant materials containing isoflavones include, but are not limited to, one or more of the following plant materials: soy bean, chick pea, red clover, subterranean clover, ground pea, milk vetch, marama bean, sword bean, jack bean, seaside sword bean, caraobean, cluster bean, balu, hyacinth bean, grass pea, Indian vetch, garden pea, djenko bean, goa bean, yam bean, broad bean, earth pea, lentil, jumping bean, alfalfa, velvet bean, African locust bean, inga, cyprus vetch, yebnut, tallow tree, Polynesian chestnut, kudzu root (Pueraria lobata), oil bean tree, mesquite, tamarind, fenugreek, Indian liquorice, ground nut, and derivatives of such plant materials, including defatted soy flakes, soy flour, and soy meal. Most preferably the isoflavone containing material is separated from either a soyabean material or a clover material, since these plants contain particularly high concentrations of isoflavones.

In one embodiment, an isoflavone containing material of the composition is an isoflavone rich portion of a plant material which is separated from other portions of the plant material. In a preferred embodiment, the plant material is a soybean material, and the isoflavone rich portion of the soybean material which is separated as the isoflavone containing material is the hypocotyl of the soy material. The hypocotyls of soy form a small proportion of the total weight of the intact soybean (approximately 2%), but are rich in isoflavones, particularly daidzein. The hypocotyls may be separated from intact soybeans by dehulling the soybean, and separating the hypocotyls from the remaining soy material by passing the soy material over a sieve of sufficient pore size to separate the relatively small hypocotyls from the remaining soy material. The separated hypocotyl material is preferably ground to produce a powder, which may be used as the isoflavone containing material in the composition of the present invention.

In another embodiment, an isoflavone containing material of the composition of the present invention may be an extract of one or more of the above listed plant materials in which the plant material(s) is/are extracted with an extractant in which isoflavones are soluble, and the extract containing the isoflavones is separated from insoluble plant materials. Preferred extractants for forming the isoflavone containing material extract include, but are not limited to, water, low molecular weight alcohols including methanol, ethanol, isopropyl alcohol, propanol, isobutyl alcohol, and butanol; ethyl acetate; acetone; acetonitrile; chloroform; and mixtures thereof Most preferably, the extractant is an aqueous ethanol or aqueous methanol extractant containing from about 55% to about 90% alcohol, by volume.

In a preferred embodiment, the isoflavone containing material of the composition of the present invention is a derivative of one or more of the above listed extracts of one or more of the above listed plant materials. A derivative of an extract, as the term is used herein, refers to a material, either solid or liquid, which can be recovered from an extract by subjecting the extract to conditions which change the physical or chemical makeup of the extract. For example a derivative, as used herein, includes a condensed form of the extract, a solid residue recovered from the extract, a purified isoflavone material recovered from the extract by high performance liquid chromatography ("HPLC"), a material containing isoflavones which is recrystallized from the extract, or a material containing isoflavones which is extracted from the extract by another extractant.

In a preferred embodiment of the invention, the isoflavone containing material is a derivative of an extract of a plant material containing isoflavones in which the isoflavone containing material is formed by concentrating the extract. The isoflavone containing material formed by concentration the extract may be a liquid or a solid material, depending on the extent of concentration of the extract. In one preferred embodiment of the invention, the isoflavone containing material is a concentrated aqueous alcohol extract of an isoflavone containing clover. In another preferred embodiment of the invention, the isoflavone containing material of the invention is condensed soy solubles, which is used in accordance with its conventional meaning in the art.

In still another preferred embodiment of the invention, the isoflavone containing material is a derivative of an extract of an isoflavone containing plant material comprising an isoflavone containing material recrystallized from the extract. Preferably the recrystallized isoflavone containing material is derived from an aqueous alcohol extract of one or more of the isoflavone containing plant materials listed above, where the recrystallized isoflavone material is recovered from the extract by concentrating the extract, cooling the concentrated extract to precipitate the isoflavone material, and separating the precipitated isoflavone containing material from the extract.

In yet another preferred embodiment of the invention, the isoflavone containing material is a derivative of an extract of an isoflavone containing plant material comprising an isoflavone containing material separated from the extract by HPLC or by reverse phase HPLC. The isoflavone containing material may be derived by HPLC or reverse phase HPLC by eluting an extract of an isoflavone containing material through an adsorbent resin which releasably binds isoflavones and impurities in a compound specific manner with an eluent in which the isoflavones are soluble, and collecting fractions of eluent containing the isoflavones. The fractions of eluent containing the isoflavones may be combined and concentrated to provide a purified isoflavone containing material. In a preferred embodiment, the isoflavone containing material is derived by reverse phase HPLC, where the eluent is selected from aqueous ethanol or methanol, acetonitrile, ethyl acetate, acetone, or combinations thereof.

The isoflavones contained in the isoflavone containing material are isoflavones which are contained naturally in the plant materials, although relative concentrations of isoflavone conjugates, isoflavone glucosides, and aglucone isoflavones may be altered from the naturally occurring concentrations of these materials in the plant material from which the isoflavones are separated, either by the process of separation or by processes specifically intended to alter the relative concentrations of these materials. In a preferred embodiment the isoflavone containing material contains at least one of the aglucone isoflavones selected from genistein, daidzein, glycitein, biochanin A, or formononetin, or at least one of the isoflavone glucosides genistin, daidzin, or glycitin, or at least one of the isoflavone conjugates 6"-OMal genistin, 6"-OAc genistin, 6"-OMal daidzin, 6"-OAc daidzin, or 6"-OMal glycitin, or mixtures thereof, where "Mal" designates "malonyl" and "Ac" designates "acetyl". The structures for the aglucone isoflavones, isoflavone glucosides, and isoflavone conjugates are shown in Formulas 1 and 2 below.

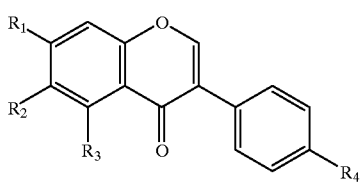

| Compound | $R_1$ | $R_2$ | $R_3$ | $R_4$ |
|---|---|---|---|---|
| Genistein | OH | H | OH | OH |
| Biochanin A | OH | H | OH | $OCH_3$ |
| Formononetin | OH | H | H | $OCH_3$ |
| Daidzein | OH | H | H | OH |
| Glycitein | OH | $OCH_3$ | H | OH |

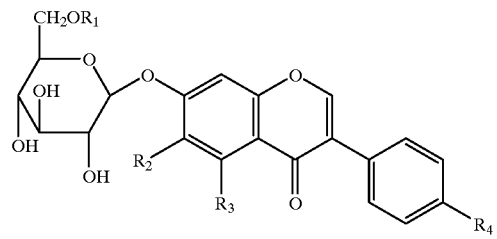

| Compound | $R_1$ | $R_2$ | $R_3$ | $R_4$ |
|---|---|---|---|---|
| Genistin | H | H | OH | OH |
| 6"-OMal genistin | $COCH_2CO_2H$ | H | OH | OH |
| 6"-OAc genistin | $COCH_3$ | H | OH | OH |
| Daidzin | H | H | H | OH |
| 6"-OMal daidzin | $COCH_2CO_2H$ | H | H | OH |
| 6"-OAc daidzin | $COCH_3$ | H | H | OH |
| Glycitin | H | $OCH_3$ | H | OH |
| 6"-OMal glycitin | $COCH_3$ | $OCH_3$ | H | OH |

Isoflavone containing materials used in the composition of the present invention may also contain, or be, a synthetically prepared isoflavone selected from the group of genistein, daidzein, glycitein, biochanin A, formononetin, or their respective glucosides or conjugates. The synthetically prepared isoflavone may be dispersed directly in the isoflavone depleted vegetable protein material of the composition, or may be mixed in a conventional, inert, food grade carrier such as cellulose, starch, flour, or other commonly used carriers.

Genistein may be prepared in accordance with known methods of synthesis such as by the methods provided by Baker et al (*J Chem. Soc.*, p. 3115 (1928)); Narasirnhachari et al. (*J. Sci Ind. Res.*, Vol. 12, p. 287 (1953)); Yoder et al., (*Proc. Iowa Acad. Sci.*, Vol. 61, p. 271 (1954); and Zemplen et al. (*Acta. Chim. Acad. Sci. Hung.*, Vol. 19, p. 277 (1959)), each reference of which is incorporated herein by reference. Genistin may be synthetically prepared by the method of Zemplen et al. (*Ber.*, Vol 76B, p. 1110 (1943)), incorporated herein by reference. The isoflavone conjugates of genistein 6"-OMal genistein and 6"-OAc genistein can be prepared by a conventional saponification of genistin with a malonyl or an acetyl anhydride, respectively.

Daidzein may be synthetically prepared by the methods provided by Baker et al (*J. Chem. Soc.*, p. 274 (1933)), Wesley et al. (*Ber.* Vol. 66, p. 685 (1933)), Mahal et al. (*J. Chem. Soc.*, p. 1769 (1934)), Baker et al. (*J Chem. Soc.*, p. 1852 (1953)), or Farkas (*Ber.* Vol. 90, p. 2940 (1957)), each reference of which is incorporated herein by reference. Daidzin may be synthetically prepared by the method of Farkas et al. (*Ber.*, Vol. 92, p. 819 (1959)), incorporated herein by reference. The daidzein isoflavone conjugates 6"-OMal daidzin and 6"-OAc daidzin can be prepared by a conventional saponification of daidzin with a malonyl or an acetyl anhydride, respectively.

Formononetin may be synthetically prepared by the methods provided by Wessely et al. (*Ber.* Vol. 66, p. 685 (1933)), or Kagel et al. (*Tet. Letters*, p. 593 (1962)), each reference of which is incorporated herein by reference.

The vegetable protein composition contains sufficient isoflavone containing material dispersed in the isoflavone depleted vegetable protein material to provide beneficial health benefits to a human consuming a serving of a food or beverage containing the vegetable protein composition. Preferably, the vegetable protein composition contains the minimum amount of isoflavone containing material necessary to provide such benefits. Preferably the vegetable protein composition contains between about 2.5 mg to 100 mg of total isoflavones per gram of isoflavone depleted vegetable protein material, or between about 1.5 mg to 85 mg of aglucone isoflavones per gram of isoflavone depleted vegetable protein material.

In another aspect, the invention is a process for forming a vegetable protein composition containing an isoflavone depleted vegetable protein material and an isoflavone containing material. The process comprises providing an isoflavone depleted vegetable protein material and providing an isoflavone containing material, and dispersing the isoflavone containing material in the isoflavone depleted vegetable protein material.

Providing an Isoflavone Depleted Vegetable Protein Material

An isoflavone depleted vegetable protein material is provided by: providing a vegetable material containing protein and isoflavones, and separating a protein material from the vegetable material in a manner which reduces the amount of isoflavones in the protein material relative to the initial concentration of isoflavones in the vegetable material. Vegetable materials which contain protein and isoflavones include soy beans, soy bean derivatives such as fall fat and defatted soy flakes, soy flour, soy grit, and soy meal, oil seeds such as rapeseed, lupin, legumes, and several varieties of peas and beans, including ground pea, chick pea, grass pea, garden pea, earth pea, marama bean, sword bean, jack bean, caraobean, cluster bean, hyacinth bean, djenko bean, goa bean, yam bean, broad bean, jumping bean, and velvet bean. The vegetable materials containing protein and isoflavones may be in a processed form, such as a flour, grit, meal, or flake.

The protein material may be separated from the vegetable material in any manner which provides a material containing a greater concentration of protein, by weight, than the vegetable material, and which reduces the amount of isoflavones in the separated protein material relative to the vegetable material. It is particularly preferred that conventional processes for forming vegetable protein concentrates and vegetable protein isolates be used to provide the isoflavone depleted vegetable protein material.

An isoflavone depleted vegetable protein concentrate may be provided by washing a vegetable material containing protein and isoflavones with an aqueous solution having a pH at about the isoelectric point of the protein, or with an alcohol solution. Preferably the initial vegetable material is a processed vegetable material which has been rendered into a flake or flour, and may have been processed to remove fat from the vegetable material. The wash removes soluble carbohydrates, isoflavones, ash, and other materials from the vegetable material.

If an aqueous wash is used, the wash may be prepared by adjusting the pH of water to about the isoelectric point of the protein with a suitable acidic or basic reagent. Typically the isoelectric point of the protein occurs at a mildly acidic pH, and preferably an aqueous solution is adjusted to about the isoelectric point with a food grade mineral acid such as hydrochloric acid.

If an alcohol wash is used, the alcohol wash should be a food grade reagent, and preferably is an aqueous ethanol solution. An aqueous ethanol solution may contain from about 55% to about 90% ethanol by volume. An alcohol wash is the preferred wash to form the isoflavone depleted vegetable protein concentrate, since vegetable protein concentrates formed by alcohol washing generally have a better taste than vegetable protein concentrates formed by aqueous washing.

The vegetable material should be contacted with sufficient wash solution to form a vegetable protein concentrate containing between 65% and 90% protein, by dry weight. The weight ratio of wash solution to vegetable material may be from about 2:1 to about 20:1, and preferably is from about 5:1 to about 10:1. Preferably the vegetable material is agitated in the wash solution for a period of time to facilitate removal of materials soluble in the wash solution from the vegetable material. The wash solution is then decanted from the vegetable material to provide the vegetable protein concentrate.

An isoflavone depleted vegetable protein isolate may be provided by extracting a vegetable material containing isoflavones and protein with water or an aqueous alkaline extractant to solubilize protein and isoflavones in the extractant, separating the extract from insoluble vegetable materials such as vegetable fibers, precipitating the protein from the extract by adjusting the pH of the extract to about the isoelectric point of the protein, and separating the precipitated protein from extract. Again, it is preferred that the initial vegetable material is a processed vegetable material which has been rendered into a flake or flour form, and, optionally, has been defatted.

The extractant is an aqueous solution having a pH of from about 7 to about 11. Conventional alkaline reagents may be employed, if desired, to raise the pH of the extractant, and preferred alkaline reagents include sodium hydroxide, potassium hydroxide, and ammonium hydroxide. It is most preferred that the extractant have a pH of from about 9 to about 10, since protein in the vegetable material is more soluble in aqueous solutions having a relatively high pH. Excessively alkaline extractants, for example having a pH above 11, are to be avoided since highly alkaline conditions may cause the formation of toxic lysinoalanine compounds from the protein.

The weight ratio of extractant to vegetable material should be sufficient to extract a substantial amount of the protein from the vegetable material. Preferably, the weight ratio of extractant to vegetable material is from about 4:1 to about 20:1, and more preferably from about 8:1 to about 16:1.

The extraction may be carried out by conventional extraction methods. In one embodiment, the extraction is carried out by a countercurrent extraction process. In another embodiment, the extraction is a double extraction, where the vegetable material is extracted with a first volume of extractant and then is extracted with a second volume of extractant, and the first and second extractant volumes are combined.

The extractant is separated from the vegetable material after the extraction to separate the solubilized protein from insoluble vegetable materials such as vegetable fibers, cellulose, and insoluble hemicelluloses. The extractant may be separated in a conventional manner from the insoluble vegetable materials, such as decantation, centrifugation and removal of the supernatant from insoluble materials, or filtration.

After the extractant is separated from the insoluble vegetable materials to form an extract containing solubilized protein, the protein in the extract is precipitated from the extract by adjusting the pH of the extract to about the isoelectric point of the protein. Typically the isoelectric point of the protein is at a mildly acidic pH, for example soy protein has an isoelectric point at pH 4.5, so the pH of the extract is adjusted by adding a sufficient amount of an acidic reagent to the extract to precipitate the protein. Preferred acidic reagents are food grade mineral acids such as hydrochloric acid and phosphoric acid.

The precipitated protein is then separated from the extract to form the isoflavone depleted vegetable protein isolate. Separation of the protein from the extract separates the protein from a significant portion of the isoflavones, since a significant portion of the isoflavones are soluble in the extract at the isoelectric point of the protein material. The separation may be effected by conventional means for separating a solid material from a liquid such as centrifugation and decantation of the supernatant, or filtration. The separated protein isolate contains at least 90% protein, by weight.

The separated isoflavone depleted protein isolate may be washed with water or an alcohol solution to further remove water or alcohol soluble materials remaining in the protein isolate. The weight ratio of the wash to the protein isolate material is preferably from about 2:1 to about 15:1, and the protein material may be washed multiple times to ensure removal of impurities. In a preferred embodiment, the wash is an aqueous ethanol wash having an ethanol content of from 55% to about 90%, since alcohol washing of vegetable protein materials generally provides a protein material with better taste than water washing.

Providing an Isoflavone Containing Material

An isoflavone containing material may be provided by separating the isoflavone containing material from a plant material containing isoflavones, or by synthetically preparing one or more isoflavones for inclusion in the isoflavone containing material. If synthetically prepared isoflavones are to be included in the isoflavone containing material, one of the above referenced procedures for synthetically preparing isoflavone compounds may be used to provide the isoflavone(s).

If the isoflavone containing material is to contain isoflavones separated from a plant material, a plant material containing isoflavones is provided. A non-exclusive list of some plant materials containing isoflavones is provided above.

The plant material may be prepared for separation of the isoflavone containing material by processing the plant material to render the isoflavones easily accessible to an extractant. The plant material may be processed by grinding or comminuting the plant, and by removing plant compounds which may interfere with separation of the isoflavones. For example, a soy bean material may be ground and then defatted by extraction with hexanes to prepare the plant material for separation of an isoflavone containing material. Leafy plants which contain substantial amounts of isoflavones in their leaves, such as clovers, may not need to be ground or comminuted prior to separation of the isoflavone containing material, however, it is preferred that any plant material is comminuted prior to separation of the isoflavone containing material.

An isoflavone containing material is separated from the plant material by extracting the plant material with an extractant in which the isoflavones are at least partially soluble. Preferred extractants include, but are not limited to: water; low molecular weight alcohols including methanol, ethanol, isopropyl alcohol, propanol, isobutyl alcohol, and butanol; ethyl acetate; acetone; acetonitrile; chloroform; and mixtures thereof Particularly preferred extractants are aqueous methanol and aqueous ethanol solutions containing from about 55% to about 90% alcohol by volume.

The extraction may be conducted by conventional extraction procedures. In one embodiment the plant material and the extractant are agitated together for a period of from 30 minutes to 24 hours at room temperature (22° C.) to effect the extraction of the isoflavones into the extractant. In another embodiment, the isoflavones are extracted by heating the plant material and the extractant for a period of from about 15 minutes to about 5 hours at a temperature from about 35° C. to the reflux temperature of the extractant. In a preferred embodiment, the plant material is refluxed in a 60%–85% aqueous methanol solution for a period of about 1 hours to about 2 hours at a temperature of about 60° C. to about 70° C. to extract the isoflavones into the aqueous methanol solution. In another preferred embodiment, the plant material is refluxed in an 60%–85% aqueous ethanol solution for a period of about 1 hour to about 2 hours at a temperature of from about 70° C. to about 80° C. to extract the isoflavones into the aqueous ethanol solution.

The extractant containing the isoflavones may then be separated from the plant material to provide an isoflavone containing material which may be dispersed in the provided isoflavone depleted vegetable protein material to provide the vegetable protein composition of the present invention. The separation may be effected by conventional procedures to separate a solid material from a liquid material. In one embodiment, the extractant and the plant material are centrifuged, and the supernatant isoflavone containing extract may be decanted from the plant material. In another embodiment, the extractant and the plant material are separated by filtering the plant material from the extractant and collecting the isoflavone enriched extract as the filtrate.

The isoflavone enriched extract may be subjected to further processing to produce an isoflavone containing material derived from the extract. In one embodiment of the invention, the isoflavone enriched extract may be concentrated by removing some, or all, or the extract solvent to produce a concentrated derivative of the extract. The isoflavone enriched extract may be concentrated by conventional procedures. For example, the extract may be concentrated by heating to evaporate the extract solvent, by being placed under reduced pressure for a sufficient time to remove some or all of the extract solvent, or, preferably, by a combination of both.

A recrystallized isoflavone containing material may also be derived from the isoflavone enriched extract. First, the extract may be concentrated as described above. Then, optionally, cold water, preferably having a temperature of from about 4° C. to about 20° C., may be added to the condensed extract. If water is added to the condensed extract, the weight ratio of the added water to the condensed extract is preferably from about 0.5:1 to about 4:1. The extract is then chilled to about 0° C. to about 20° C. to allow the isoflavone containing material to crystallize. The recrystallized isoflavone containing material may then be recovered by conventional procedures for separating a solid material from a liquid, and preferably is filtered from the remaining extract.

A highly purified isoflavone containing material may also be derived from the isoflavone enriched extract by chromatography, preferably by HPLC. The extract may be concentrated, if desired, or the extract may utilized without subsequent concentration. The extract, or concentrated extract, is initially filtered to remove insoluble material that could plug an HPLC column. Preferably the extract is filtered by being passed through a Whatman No. 5 filter, and then through a 0.45 g filter.

An HPLC column is prepared by packing a conventional commercially available HPLC column with a particulate adsorbent material capable of releasably binding isoflavones and non-isoflavone impurities in a compound specific manner. The adsorbent material may be any reverse phase HPLC packing material, however, a preferred packing material may be chosen on the basis of load capacity, separation effectiveness, and cost. One such preferred packing material is Kromasil C18 16 $\mu$m 100 Å beads available from Eka Nobel, Nobel Industries, Sweden.

The filtered extract, or concentrated extract, may then be passed through the packed HPLC column until all the binding sites of the column are fully saturated with isoflavones, which is detected by the appearance of isoflavones in the effluent from the column. The HPLC column may then be eluted with an eluent such as aqueous alcohol, acetonitrile, ethyl acetate, acetone, water, or combinations thereof to effect the separation of the isoflavones from other compounds in the extract.

In a particularly preferred embodiment, the eluent is an aqueous ethanol solution. The aqueous ethanol may have an alcohol content of between about 10% and 90% alcohol by volume. When a single concentration of ethanol is used as the eluent, the aqueous ethanol preferably has an alcohol content of about 50% by volume. It is more preferred, however, to use a step-wise gradient of eluents, where the column is initially eluted with an aqueous ethanol eluent having a low alcohol content, followed by successive aqueous ethanol eluents containing greater alcohol content. For example, a first eluent may be a 20% aqueous ethanol solution, a second eluent may be a 50% aqueous ethanol solution, and a final eluent may be an 80% aqueous ethanol solution.

Fractions of the isoflavone containing material are collected from the column effluent. The fractions of effluent containing isoflavones are identified, preferably by UV absorption at 262 nm, and separated from fractions of the effluent containing non-isoflavone materials. The collected fractions of the isoflavone containing material are then combined to provide a purified isoflavone containing material. The eluent in the combined fractions of isoflavone containing materials may be evaporated by heat, by reduced pressure, or by a combination thereof, to produce a solid purified isoflavone containing material.

Dispersing the Isoflavone containing Material in the Isoflavone Depleted Vegetable Protein Material The isoflavone containing material may be dispersed in the isoflavone depleted vegetable protein material according to conventional methods. If the isoflavone containing material is a liquid, the isoflavone containing material may be sprayed onto the vegetable protein material as the vegetable protein material is agitated. Preferably a liquid isoflavone containing material is atomized as it is sprayed onto the vegetable protein material. A liquid isoflavone containing material may also be poured into the isoflavone depleted vegetable protein material and mixed together with the protein material.

If the isoflavone containing material is a solid, the solid material is preferably ground into a powder prior to dispersing the material in the isoflavone depleted vegetable protein material. The powder may then be mixed directly with the vegetable protein material. The isoflavone enriched powder material and the vegetable protein material are preferably agitated together to uniformly disperse the isoflavone containing material in the protein material.

If the isoflavone depleted vegetable protein material is dispersed in a liquid, either as a slurry or a solution, the isoflavone containing material, whether liquid or solid, may be added to and mixed in the slurry or solution of isoflavone depleted vegetable protein material. Preferably the isoflavone containing material is mixed in a slurry or solution of isoflavone depleted vegetable protein material by agitating the mixture, for example, with a stirring paddle.

In another embodiment, a solid isoflavone containing material may be mixed with a liquid dispersing agent, preferably soy oil or lecithin, and coated on the isoflavone depleted vegetable protein material. The liquid dispersing agent containing the isoflavone containing material may be applied by directly adding the liquid dispersing agent to the vegetable protein material and mixing, for example with a ribbon blender, or by spraying the liquid dispersing agent on the vegetable protein material while agitating the protein material.

In another aspect, the present invention is a process for forming a vegetable protein composition containing an isoflavone depleted vegetable protein material and an isoflavone containing material, where the isoflavone depleted vegetable protein material and the isoflavone containing material are derived from the same vegetable material. The process includes the steps of providing a vegetable material containing protein and isoflavones, extracting the vegetable material with an extractant effective to solubilize isoflavones to form an extract containing isoflavones, separating an isoflavone depleted vegetable protein material from the extract containing isoflavones, forming an isoflavone containing material from the extract, and dispersing the isoflavone containing material in the isoflavone depleted vegetable protein material.

A vegetable material containing protein and isoflavones is provided, preferably by selecting a vegetable material from the vegetable materials listed above which contain isoflavones and protein. In a preferred embodiment, the vegetable material is a soy bean material, including processed or unprocessed soy bean materials. In a most preferred embodiment, the vegetable material is a soy flake, soy flour, or soy meal material.

The vegetable material is extracted with a extractant which is effective to solubilize isoflavones, where a non-exclusive list of such extractants is provided above. In one embodiment, the vegetable material is extracted with a extractant as described above in the process for forming a vegetable protein concentrate, where the isoflavones are contained in the extractant, and the protein is insoluble in the extractant. In another embodiment, the vegetable material is extracted with a extractant as described above in the process for forming a vegetable protein isolate, where the isoflavones and protein are contained in the extractant, and are separated from vegetable materials which are insoluble in the extractant.

An isoflavone depleted vegetable protein material is then separated from the extract containing isoflavones. In one embodiment, the isoflavone depleted material is a vegetable protein concentrate, which is separated from the extract, or wash, containing the isoflavones as described above with respect to vegetable protein concentrates. In another embodiment, the isoflavone depleted material is a vegetable protein isolate, which is separated from the extract containing isoflavones by precipitating the vegetable protein material from the extract, and separating the precipitated protein material from the extract, as described above with respect to vegetable protein isolates.

An isoflavone containing material is then formed from the extract. The isoflavone containing material is a derivative of the extract, where the isoflavone containing material may be derived from the extract by concentrating the extract, recrystallizing the isoflavone containing material from the extract, or purifying the isoflavone containing material from the extract, as described above with respect to providing an isoflavone containing material from an extract. In this embodiment of the invention, the isoflavone containing material should not be the extract itself, since recombining the extract with the isoflavone depleted vegetable protein material formed by the extraction will recombine all the components of the initial vegetable material, and will not result in a vegetable protein material having improved taste or functional properties.

The isoflavone containing material may then be dispersed in the isoflavone depleted vegetable protein material. The isoflavone containing material may be dispersed in the vegetable protein material as described above.

The vegetable protein composition of the present invention can be used in a variety of foods to provide nutritional fortification, and functional properties. For example, the vegetable protein composition can be added to foods including, but not limited to, meats such as ground meats, emulsified meats, marinated meats; beverages such as nutritional beverages, sports beverages, protein fortified beverages, juices, milk, milk alternatives, and weight loss beverages; nutritional food bars; cheeses such as hard and soft cheeses, cream cheese, and cottage cheese; frozen desserts such as ice cream, ice milk, low fat frozen desserts, and non-dairy frozen desserts; yogurts; soups; puddings; bakery products; salad dressings; and dips and spreads such as mayonnaise and chip dips.

The following Formulations 1–4 illustrate foods or beverages that may be formed using a vegetable protein composition of the present invention. The vegetable protein composition used in the formulations is a soy protein isolate having an isoflavone containing material dispersed therein, where the isoflavone containing material contains several of the isoflavone compounds of Formula 1 and/or Formula 2. The vegetable protein composition in the following examples typically contains between about 2.5 to about 5 milligrams total isoflavones per gram of protein.

Formulation 1

Ready to drink beverage

A ready to drink beverage is formed of the following components:

| Ingredient | Percent of composition, by weight |
| --- | --- |
| Water | 80–85 |
| Vegetable protein composition | 10–15 |
| Sucrose | 5–8 |
| Cocoa | 0.1–1 |
| Vitamins/Minerals | 0.1–1 |
| Flavor | 0.1–1 |
| Cellulose gel | 0.1–0.5 |

The ready to drink beverage may be served in 8 ounce servings containing about grams of the vegetable protein composition including about 50 to about 100 milligrams of the isoflavone compounds.

Formulation 2

Powdered beverage

A powdered beverage is formed of the following components:

| Ingredient | Percent of composition, by weight |
| --- | --- |
| Vegetable protein composition | 85–90 |
| Sucrose | 8–15 |
| Maltodextrin | 1–5 |
| Vitamins/Minerals | 0.5–2 |
| Aspartame | 0–0.5 |
| Flavor | 0–0.5 |

30 grams of the powdered beverage formulation may be added to water to form a serving containing about 25 grams of the vegetable protein composition including about 62 to about 125 milligrams of the isoflavone compounds.

Formulation 3

Food bar

A food bar is formed of the following components:

| Ingredients | Percent of composition, by weight |
| --- | --- |
| Vegetable protein composition | 20–30 |
| Corn syrup | 35–45 |
| Rice syrup solids | 7–14 |
| Glycerin | 1–5 |
| Cocoa | 2–7 |
| Compound coating | 15–25 |

The food bar may be served in 70 gram portions containing about 15 grams of the vegetable protein composition having about 37 to about 75 milligrams of the isoflavone compounds therein.

Formulation 4

Yogurt

A yogurt is formed of the following components:

| Ingredients | Percent of composition, by weight |
| --- | --- |
| Water | 65–75 |
| Vegetable protein composition | 5–15 |
| Sucrose | 3–8 |
| Corn starch | 1–5 |
| Dextrin | 0.3–1 |
| Cellulose gel | 1–3 |
| Culture (yogurt) | 0.01–0.1 |
| Fruit | 10–20 |
| Vitamins/Minerals | 0.05–0.3 |

The yogurt may be served in a 170 gram serving containing about 8 grams of the vegetable protein composition having about 20 to about 40 milligrams of isoflavone compounds therein.

The following non-limiting examples illustrate the vegetable protein composition of the present invention and processes for producing the composition.

EXAMPLE 1

In a first experiment, an isoflavone depleted soy protein isolate is formed. 150 lbs. of defatted soybean flakes are slurried in 1500 lbs. of water heated to a temperature of 33° C. in an extraction tank. Sufficient calcium hydroxide (about 1.3% by weight) is added to the soybean flake slurry to adjust the pH of the slurry to 9.7. The soy flakes are extracted for a period of 30 minutes after which the aqueous solution is separated from the extracted flakes by centrifugation. The aqueous extract is held while the extracted flake residue is redispersed in 900 lb. of water heated to a temperature of 33° C. The pH of the extracted flake slurry at this point is 9.0. A second aqueous extract is collected by centrifuging, and the first and second extracts are combined. To the combined aqueous extracts 85% phosphoric acid is added to adjust the pH to 4.5 (the isoelectric point of soy protein) to precipitate the protein. The precipitated protein is then separated from the combined aqueous extracts, and is washed with 100 lbs. of aqueous ethanol (80%) to form the isoflavone depleted protein isolate.

EXAMPLE 2

In a second experiment, an isoflavone depleted soy protein concentrate is formed. 100 lbs. of defatted soy flakes are placed in a mixing tank with 1000 lbs. of aqueous ethanol (80%) heated to 35° C. The flakes and aqueous ethanol are agitated in the mixing tank for 30 minutes. The aqueous alcohol extract is removed from the soy flake material by centrifugation and decantation of the supernatant to provide the isoflavone depleted soy protein concentrate.

EXAMPLE 3

An isoflavone depleted soy protein isolate is formed from an alcohol extracted isoflavone depleted soy protein concentrate. An alcohol extracted isoflavone depleted soy protein concentrate is formed as described in Example 2. The alcohol extracted soy protein concentrate is slurried in 700 lbs. of water heated to a temperature of 33° C. in an extraction tank. Sufficient calcium hydroxide is added to the slurry to adjust the pH of the slurry to 9.7. The slurry is extracted for a period of 45 minutes, after which an aqueous extract containing solubilized soy protein is separated from insoluble materials in the slurry by centrifugation. The aqueous extract is held while the extracted insoluble materials are redispersed in 450 lbs. of water heated to a temperature of 33° C. A second aqueous extract is collected by centrifuging, and the first and second extracts are combined. Sufficient hydrochloric acid is added to the combined extracts to adjust the pH of the combined extracts to 4.5 to precipitate the solubilized protein. The precipitated protein is then separated from the combined extracts, and is washed with 70 lbs. of water to form an isoflavone depleted soy protein isolate.

EXAMPLE 4

An isoflavone containing material is formed from a defatted soy flake material. 100 lbs. of a defatted soy flake material is placed in a mixing tank containing 1000 lbs. of aqueous ethanol (80%) heated to 35° C. The flakes and aqueous ethanol are agitated in the mixing tank for 30 minutes. The aqueous ethanol extract, enriched in isoflavones, is separated from the soy flake material by centriflgation. The aqueous ethanol extract is concentrated by heating the extract to 45° C. under reduced pressure until substantially all of the alcohol in the extract is removed. The concentrated extract contains about 50% solids by weight, and is an isoflavone containing material.

EXAMPLE 5

A recrystallized isoflavone containing material is formed. 200 lbs. of a concentrated aqueous ethanol extract is formed in accordance with Example 4. 180 lbs. of cold water having a temperature of 13° C. is added to the concentrated extract. The concentrated extract/water mixture is held at 7° C. for 24 hours, and the isoflavone containing material is recovered as a crystallized solid material from the solution.

EXAMPLE 6

A purified isoflavone containing material is formed. 900 lbs. of aqueous ethanol extract is formed in accordance with Example 4, except that the extract is not concentrated after being separated from the soy flakes. The extract is filtered, and then loaded onto a HPLC column packed with Kromasil C18 16 μm 100 Å beads from Eka Nobel, Nobel Industries, Sweden. The column is eluted with 3 column volumes of 30% aqueous ethanol, followed by 3 column volumes of 50% aqueous ethanol, followed by 3 column volumes of 80% aqueous ethanol. Fractions of isoflavone containing eluent are collected from the effluent of the column, where the isoflavones are detected by UV absorption at 262 nm. The isoflavone containing eluent fractions are combined, and are concentrated to a solid residue by heating the fractions to 50° C. under reduced pressure. The solid residue is collected to provide a purified isoflavone containing material.

EXAMPLE 7

An isoflavone containing material is formed from red clover. Red clover is dried, and placed in a mixing tank with an aqueous ethanol solution (75%) heated to 80° C. The clover and aqueous ethanol solution are mixed for a period of 10 hours while maintaining the temperature of the mixture at 80° C. After the clover and extract have been mixed, an isoflavone enriched extract is recovered by centrifuging the mixture and decanting the isoflavone enriched supernatant. The isoflavone enriched extract is concentrated by heating to 60° C. under reduced pressure for a time sufficient to remove the extract and leave an isoflavone enriched residue.

EXAMPLE 8

A vegetable protein composition of the present invention is formed by dispersing any one of the isoflavone containing materials formed in Examples 4–8 in the soy protein isolate formed in Example 1. The soy protein isolate is placed in a mixing tank, and the isoflavone containing material is added to the soy protein. The soy protein isolate and the isoflavone containing material are mixed together for a period of 30 minutes, after which the vegetable protein composition is recovered.

EXAMPLE 9

A vegetable protein composition of the present invention is formed by dispersing any one of the isoflavone containing materials formed in Examples 4–8 in the soy protein concentrate formed in Example 2. The soy protein concentrate is placed in a mixing tank, and the isoflavone containing material is added to the soy protein concentrate. The soy protein concentrate and the isoflavone containing material are mixed together for a period of 30 minutes, after which the vegetable protein composition is recovered.

EXAMPLE 10

A vegetable protein composition of the present invention is formed by dispersing any one of the isoflavone containing materials formed in Examples 4–8 in the soy protein isolate formed in Example 3. The soy protein isolate is placed in a mixing tank, and the isoflavone containing material is added to the soy protein. The soy protein isolate and the isoflavone containing material are mixed together for a period of 30 minutes, after which the vegetable protein composition is recovered.

It is to be understood that the foregoing are merely preferred embodiments of the invention and that various changes and alterations can be made without departing from the spirit and broader aspects thereof as set forth in the appended claims, which are to be interpreted in accordance with the principles of patent law including the Doctrine of Equivalents.

What is claimed is:

1. A vegetable protein composition, comprising:
   an isoflavone depleted vegetable protein material which is a soy protein concentrate or a soy protein isolate; and
   an isoflavone containing material dispersed in said isoflavone depleted vegetable protein material.

2. The vegetable protein composition of claim 1 wherein said soy protein concentrate is an ethanol extracted soy protein concentrate.

3. The vegetable protein composition of claim 1 wherein said soy protein concentrate is an aqueous acid extracted soy protein concentrate.

4. The vegetable protein composition of claim 1 wherein said isoflavone containing material is a material separated from a plant material containing isoflavones.

5. The vegetable protein composition of claim 4 wherein said isoflavone containing material is separated from a plant material selected from the group consisting of soy bean, chick pea, red clover, subterranean clover, ground pea, milk vetch, marama bean, sword bean, jack bean, seaside sword bean, carobean, cluster bean, balu, hyacinth bean, grass pea, Indian vetch, garden pea, djenko bean, goa bean, yam bean, broad bean, earth pea, lentil, jumping bean, alfalfa, velvet bean, African locust bean, inga, cyprus vetch, yebnut, tallow tree, Polynesian chestnut, kudzu root (Pueraria lobata), oil bean tree, mesquite, tamarind, fenugreek, Indian liquorice, ground nut, and derivatives of said plant materials.

6. The vegetable protein composition of claim 4 wherein said isoflavone containing material is an extract of said plant material.

7. The vegetable protein composition of claim 6 wherein said extract of said plant material is an alcohol, ethyl acetate, acetone, aqueous, acetonitrile, or chloroform extract of said plant material.

8. The vegetable protein composition of claim 6 wherein said isoflavone containing material is a concentrated extract of said plant material.

9. The vegetable protein composition of claim 8 wherein said plant material is a soy material, and said concentrated extract of said plant material is condensed soy solubles.

10. The vegetable protein composition of claim 8 wherein said plant material is a clover material, and said concentrated extract of said plant material is a condensed aqueous alcohol clover extract.

11. The vegetable protein composition of claim 6 wherein said isoflavone containing material is a derivative of an extract of said plant material.

12. The vegetable protein composition of claim 11 wherein said derivative of an extract of said plant material is a solid material concentrated from said extract.

13. The vegetable protein composition of claim 11 wherein said derivative of an extract of said plant material is a purified isoflavone material.

14. The vegetable protein composition of claim 1 wherein said isoflavone containing material contains at least one synthetically formed isoflavone.

15. The vegetable protein composition of claim 1, wherein said isoflavone containing material contains at least one or more isoflavones selected from the group consisting of genistein, daidzein, glycitein, formononetin, biochanin A, genistin, daidzin, glycitin, 6"-OMal genistin, 6"-OAc genistin, 6"-OMal daidzin, 6"-OAc daidzin, 6"-OMal glycitin, and mixtures thereof.

16. The vegetable protein composition of claim 1, wherein said vegetable protein composition contains from about 2.5 mg to about 100 mg of total isoflavones per gram of protein.

17. The vegetable protein composition of claim 16 wherein said vegetable protein composition contains from about 1.5 mg to about 85 mg of aglucone isoflavones per gram of protein.

18. A process for forming a vegetable protein composition, comprising:
   providing an isoflavone depleted vegetable protein material, where said isoflavone depleted vegetable protein material is a soy protein concentrate or a soy protein isolate;
   providing an isoflavone containing material; and
   dispersing said isoflavone containing material in said isoflavone depleted vegetable protein material.

19. The process as set forth in claim 18 wherein said soy protein concentrate is an alcohol extracted soy protein concentrate.

20. The process as set forth in claim 18 wherein said soy protein concentrate is an aqueous acid extracted soy protein concentrate.

21. The process as set forth in claim 18 wherein providing an isoflavone containing material comprises separating an isoflavone containing material from a plant material containing isoflavones.

22. The process as set forth in claim 21 wherein said isoflavone containing material is separated from at least one plant material selected from the group consisting of soy bean, chick pea, red clover, subterranean clover, ground pea, milk vetch, marama bean, sword bean, jack bean, seaside sword bean, carobean, cluster bean, balu, hyacinth bean, grass pea, Indian vetch, garden pea, djenko bean, goa bean, yam bean, broad bean, earth pea, lentil, jumping bean, alfalfa, velvet bean, African locust bean, inga, cyprus vetch, yebnut, tallow tree, Polynesian chestnut, kudzu root (Pueraria lobata), oil bean tree, mesquite, tamarind, fenugreek, Indian liquorice, ground nut, and derivatives of said plant materials.

23. The process as set forth in claim 21 wherein said isoflavone containing material is separated from said plant material by extracting said plant material with an extractant in which isoflavones are soluble and separating said extractant from said plant material to form an extract containing isoflavones.

24. The process as set forth in claim 23 wherein said extractant is selected from the group consisting of water; low molecular weight alcohols, including methanol, ethanol, propanol, isopropyl alcohol, butanol, and isobutyl alcohol; ethyl acetate; acetone; acetonitrile; chloroform; and mixtures thereof.

25. The process as set forth in claim 23 wherein said isoflavone containing extract is concentrated after being separated from said plant material.

26. The process as set forth in claim 23 wherein said isoflavone containing material is a derivative of said extract.

27. The process as set forth in claim 23 wherein said derivative of said isoflavone containing extract of said plant material is a solid material concentrated from said extract.

28. The process as set forth in claim 23 wherein said derivative of said isoflavone containing extract of said plant material is a purified isoflavone material.

29. The process as set forth in claim 18 wherein providing an isoflavone containing material comprises providing condensed soy solubles.

30. The process as set forth in claim 18 wherein providing an isoflavone containing material comprises providing a material containing at least one or more isoflavones selected from the group con genistein, daidzein, glycitein, formononetin, biochanin A, genistin, daidzin, glycitin, 6"-OMal genistin, 6"-OAc genistin, 6"-OMal daidzin, 6"-OAc daidzin, 6"-OMal glycitin, and mixtures thereof.

31. The process as set forth in claim 18 wherein dispersing said isoflavone containing material in said isoflavone depleted vegetable protein material comprises mixing said isoflavone containing material in said isoflavone depleted vegetable protein material.

32. The process as set forth in claim 18 wherein said isoflavone containing material is dispersed in said isoflavone depleted vegetable protein material so that from about 2.5 mg to about 100 mg of total isoflavones are present per gram of isoflavone depleted vegetable protein material.

33. The process as set forth in claim 25 wherein said isoflavone containing material is dispersed in said isoflavone depleted vegetable protein material so that from about 1.5 mg to about 85 mg of aglucone isoflavones are present per gram of isoflavone depleted vegetable protein material.

34. A process for forming a vegetable protein composition, comprising:
   providing a vegetable material containing protein and isoflavones;
   extracting said vegetable material with an extractant effective to solubilize isoflavones to form an extract containing isoflavones;
   separating an isoflavone depleted vegetable protein material containing at least 65% protein by dry weight from said extract containing isoflavones;

forming an isoflavone containing material from said extract;

dispersing said isoflavone containing material in said isoflavone depleted vegetable protein material.

35. The process as set forth in claim 34 wherein providing a vegetable material containing protein and isoflavones comprises providing a soy material.

36. The process as set forth in claim 35 wherein said soy material is selected from the group consisting of soy flakes, soy flour, soy grit, and soy meal.

37. The process as set forth in claim 34 wherein said extractant is selected from the group consisting of water, a low molecular weight alcohol, ethyl acetate, acetone, acetonitrile, and mixtures thereof.

38. The process as set forth in claim 34 wherein the weight ratio of said extractant to said vegetable material is from about 2:1 to about 16:1.

39. The process as set forth in claim 34 wherein said isoflavone depleted vegetable protein material is separated from said extract containing isoflavones by centrifuging said vegetable material and said extractant, and decanting said extract from said vegetable protein material.

40. The process as set forth in claim 34 wherein said isoflavone depleted vegetable protein material is separated from said extract containing isoflavones by filtering said extract from said vegetable protein material.

41. The process as set forth in claim 34 wherein said extractant is an aqueous alkaline extractant effective to solubilize said protein and said isoflavones in said vegetable material.

42. The process as set forth in claim 41 further comprising the step of separating said aqueous alkaline extractant from insoluble vegetable materials prior to separating said isoflavone depleted protein material from said extract containing isoflavones.

43. The process as set forth in claim 41 wherein separating said isoflavone depleted protein material from said extract containing isoflavones comprises adjusting the pH of said aqueous alkaline extractant to about the isoelectric point of said protein in said extractant to precipitate said isoflavone depleted protein material, and separating said precipitated isoflavone depleted protein material from said aqueous extractant at a pH about the isoelectric point of said protein to produce a vegetable protein isolate and an extract containing isoflavones.

44. The process as set forth in claim 34 wherein said vegetable material is extracted with an aqueous alcohol extractant, and a vegetable protein concentrate is separated from said extract containing isoflavones.

45. The process as set forth in claim 34 wherein said vegetable material is extracted with an acidic aqueous solution having a pH at about the isoelectric point of said protein in said vegetable material, and a vegetable protein concentrate is separated from said extract containing isoflavones.

46. The process as set forth in claim 34 wherein said isoflavone containing material is formed from said extract by concentrating said extract.

47. The process as set forth in claim 34 wherein said isoflavone containing material is formed from said extract by recrystallizing said isoflavone containing material in said extract, and separating said recrystallized isoflavone containing material from said extract.

48. The process as set forth in claim 34 wherein said isoflavone containing material is formed from said extract by contacting said extract with an adsorbent material capable of releasably binding isoflavones and non-isoflavone compounds in a compound specific manner, and, after contacting said extract with said adsorbent material, eluting said adsorbent material with an eluent in which said isoflavones are soluble, and collecting fractions of said eluent containing a purified isoflavone material.

49. A food composition, comprising:

a food material; and a vegetable protein composition containing an isoflavone depleted vegetable protein material having an isoflavone containing material dispersed therein, wherein said isoflavone depleted vegetable protein material is a soy protein concentrate or a soy protein isolate.

50. The food composition of claim 49, wherein said food material is beverage.

51. The food composition of claim 49 wherein said food material is a meat.

52. The food composition of claim 49 wherein said food material is a nutritional food bar.

53. The food composition of claim 49 wherein said food material is a cheese.

54. The food composition of claim 49 wherein said food material is a yogurt.

55. The vegetable protein composition of claim 5 wherein a derivative of said plant materials is selected from the group consisting of defatted soy flakes, soy flour, and soy meal.

56. The process as set forth in claim 22 wherein a derivative of said plant materials is selected from the group consisting of defatted soy flakes, soy flour, and soy meal.

57. The process as set forth in claim 37 wherein said low molecular weight alcohol is selected from the group consisting of methanol, ethanol, isopropyl alcohol, propanol, butanol, and isobutyl alcohol.

* * * * *